United States Patent
Nah

(10) Patent No.: US 6,738,627 B1
(45) Date of Patent: May 18, 2004

(54) APPARATUS AND METHOD FOR PROCESSING DATA CALL OF MOBILE COMMUNICATION SYSTEM

(75) Inventor: Mahn Gil Nah, Seoul (KR)

(73) Assignee: LG Electronics Inc., Seoul (KR)

( * ) Notice: Subject to any disclaimer, the term of this patent is extended or adjusted under 35 U.S.C. 154(b) by 425 days.

(21) Appl. No.: 09/660,263

(22) Filed: Sep. 12, 2000

(30) Foreign Application Priority Data

Sep. 14, 1999 (KR) .......................................... 1999-39423

(51) Int. Cl.[7] .................................................. H04Q 7/20
(52) U.S. Cl. ........................ 455/453; 455/560; 370/328; 370/331
(58) Field of Search ................................ 370/218, 219, 370/220, 401, 328, 352, 465, 466, 468; 455/453, 463, 524, 525, 436, 445, 451, 560

(56) References Cited

U.S. PATENT DOCUMENTS

| | | | | |
|---|---|---|---|---|
| 5,548,533 A | * | 8/1996 | Gao et al. ..................... | 709/235 |
| 5,850,391 A | * | 12/1998 | Essigmann .................... | 370/331 |
| 5,878,343 A | * | 3/1999 | Robert et al. ................ | 455/424 |
| 5,905,714 A | * | 5/1999 | Havansi ...................... | 370/242 |
| 5,936,948 A | * | 8/1999 | Sicher ........................ | 370/314 |
| 5,949,773 A | * | 9/1999 | Bhalla et al. ................ | 370/331 |
| 5,978,681 A | * | 11/1999 | Bertacchi .................... | 455/445 |
| 6,094,419 A | * | 7/2000 | Ohyoshi et al. ............. | 370/231 |
| 6,173,183 B1 | * | 1/2001 | Abu-Amara et al. ......... | 455/442 |
| 6,243,582 B1 | * | 6/2001 | Lahtinen ..................... | 455/436 |
| 6,295,452 B1 | * | 9/2001 | Choi .......................... | 455/436 |
| 6,385,178 B1 | * | 5/2002 | Palviainen .................. | 370/328 |
| 6,408,182 B1 | * | 6/2002 | Davidson et al. ........... | 455/433 |
| 6,442,167 B1 | * | 8/2002 | Aramaki et al. ........ | 370/395.43 |
| 6,675,208 B1 | * | 1/2003 | Rai et al. .................... | 709/224 |
| 6,529,490 B1 | * | 3/2003 | Oh et al. .................... | 370/331 |

* cited by examiner

Primary Examiner—Charles Appiah
(74) Attorney, Agent, or Firm—Fleshner & Kim, LLP

(57) ABSTRACT

An apparatus and a method is disclosed for processing data call on mobile communication network which is capable of using resources of a switch and an IWF of another MSC by connecting a plurality of MSCs with each other and making incoming/outgoing call processing possible when an overload or error occurs on one switch or IWF of one MSC. The apparatus and method allow for providing data reliable service by communicating and transferring information with the other switch when the overload or error occurs on a frame relay module and IWF of the first MSC. Resources are thus used optimally by providing data service on the MSC without IWF by using resources of the other MSC. In addition, this allows the system to continuously provide data service when a change or test of IWF equipment is performed.

21 Claims, 5 Drawing Sheets

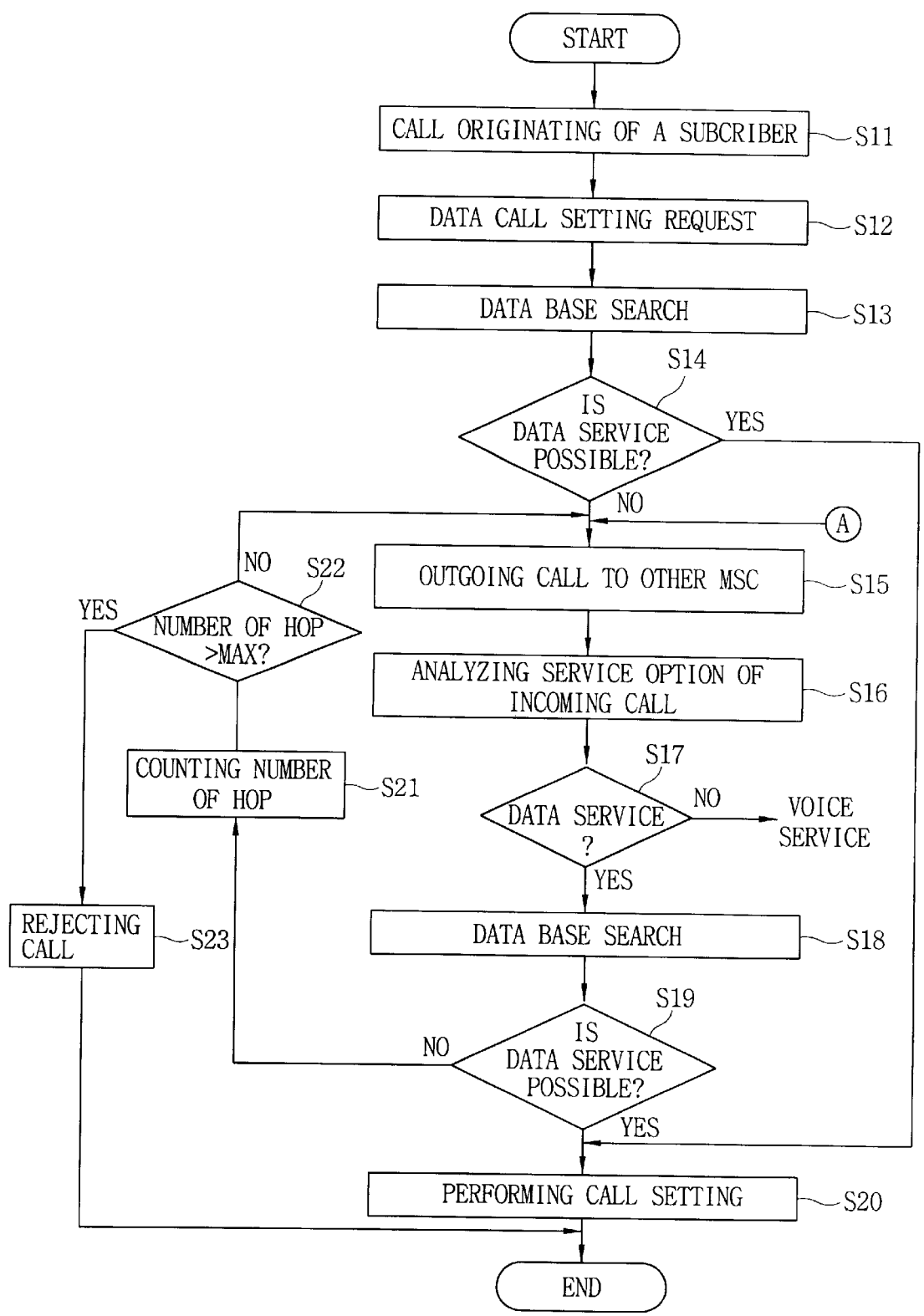

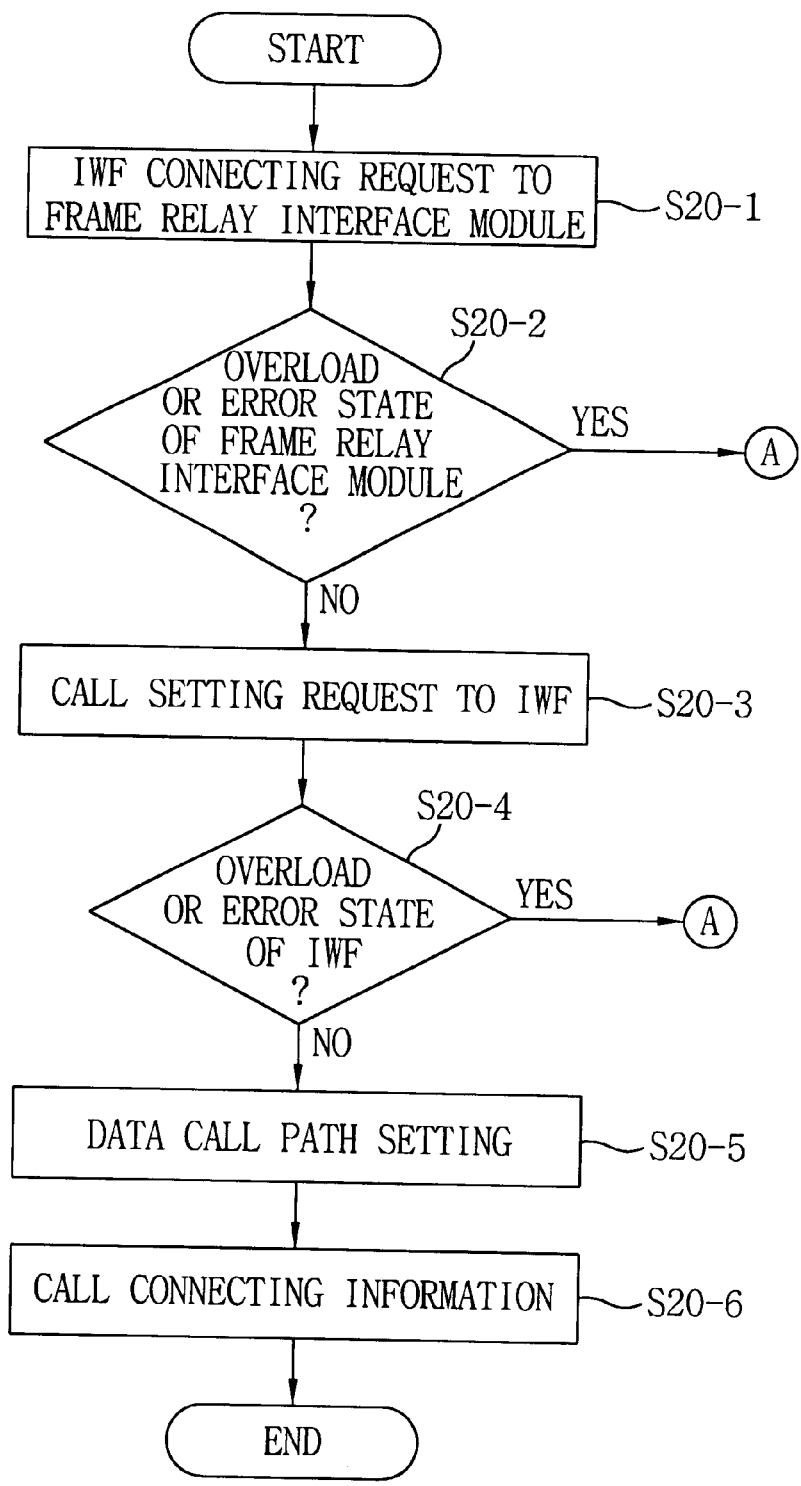

APPARATUS AND METHOD FOR PROCESSING DATA CALL OF MOBILE COMMUNICATION SYSTEM

BACKGROUND OF THE INVENTION

1. Field of the Invention

The present invention relates to a mobile communication system, and in particular to an apparatus and method for processing a data call on 2.5 generation mobile communication network.

2. Background of the Related Art

A related art data service on a 2.5 generation mobile communication network allots certain channels and provides circuit or packet data service paths through signaling, as defined at IS-658, IS-707(TIA/EIA), Q.933 and Q.931(ITU-T), which are the standard protocols between a switching system and an Interworking Function (IWF).

As depicted FIG. 1, the related art mobile network comprises a subscriber terminal 1, a Base Tranceiver Subsystem/Base Station Controller (BTS/BSC) 2, a Mobile Switch Center (MSC) 3 and an IWF 4. The MSC 3 includes a subscriber module 3-1 and a frame relay interface module 3-2.

FIG. 2 is a flow chart illustrating a process of the related art data call processing on the 2.5 generation mobile communication network. As shown in FIG. 2, an originating data call is inputted to the BTS/BSC 2 from a subscriber terminal as shown in step S1. The BTS/BSC 2 then requests a data call setting of the MSC 3, as shown in step S2.

The subscriber module 3-1 of the MSC 3 recognizes the call as either a circuit or packet data call after analyzing a service option set by the subscriber terminal. The MSC 3 then requests a connection with the IWF through the frame relay interface module 3-2, in order to provide a data path through the IWF 4, as shown in step S3.

Specifically, a frame relay interface module 3-2 requests the call setting to the IWF 4 in accordance with a defined procedure of Q.933, which is the frame relay interface signal standard between the IWF 4. It also allots the H0 channel as the bearer channel and provides the circuit or packet data call path, as shown in step S4.

The protocol required for circuit or packet data service between the terminal and the IWF 4 sets the physical path. When circuit data service is required, the IWF 4 allots modem resources in order to provide circuit data service. The IWF further sets a data path through an Integrated Service Digital Network Primary Rate Interface (ISDN PRI) module (not shown) and signaling inside of the MSC 3, and thus provides circuit data service.

When, on the other hand, packet data call is required, the IWF 4 provides packet data service through a router connected to itself.

If, however, there is a MSC 3 without the IWF 4, data service is impossible, and the subscriber module 3-1 of the pertinent MSC 3 accordingly rejects all inputted data calls as shown in step S2'.

In addition, a call processing circuit or state managing circuit (not shown) of the frame relay interface module 3-2 checks a device state of the frame relay interface module, a bearer channel state, a signal channel state, and an H0 channel occupation state. When an overload or error occurs on the frame relay interface module 3-2, it rejects all calls received from the mobile communication subscriber are rejected, as shown in step S3'.

When an overload or error occurs on the IWF 4, one of the call processing circuit and state managing circuit of the frame relay interface module detects the error during signaling with the IWF 4, and rejects the call as shown in step S4'.

As described above, in the related art technology, when the IWF of a mobile communication network is in an abnormal or overload state, or if a frame relay module of a MSC is in an overload or error state, wireless data service can not be provided, because a MSC without the IWF cannot set data service itself.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to provide an apparatus and a method for processing data call on mobile communication network which is capable of using switch resources and IWF resources of the other MSC by connecting a plurality of MSC each other and making incoming/outgoing call processing possible each other when overload or error occurs on a MSC or IWF in data call attempting.

The other object of the present invention is to provide wireless data set,ice on a MSC without IWF by using IWF resources of other MSCs.

Another object of the present invention is to provide data service continuously when change or testing of operation equipment of an MSC is performed by getting the data route other MSC.

To achieve above-mentioned objects, an apparatus for processing data call on mobile communication network comprises a first MSC which performs outgoing to a second switch set in advance when its data service is impossible, and the second MSC incoming-performs call from the first MSC and provides data call path between IWF (Interworking Function).

In addition, to achieve above-mentioned objects, data call processing process on mobile communication network comprises recording process which checks overload or error occurrence on the first MSC and records whether data service is possible or not on database, judging process which judges whether data service is possible or not by searching the database after data call setting requirement is inputted, requesting process which requests outgoing to the set second MSC when data service of the first MSC is impossible, and providing process which incoming-performs the call from the first MSC, sets IWF and data call path connected to the second MSC, and provides data service.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 is a flow chart illustrating the process of a data call processing on a mobile communication network of a preferred embodiment of the present invention.

FIG. 5 is a flow chart illustrating the call setting process of FIG. 4.

DETAILED DESCRIPTION OF PREFERRED EMBODIMENTS

Figure 1:
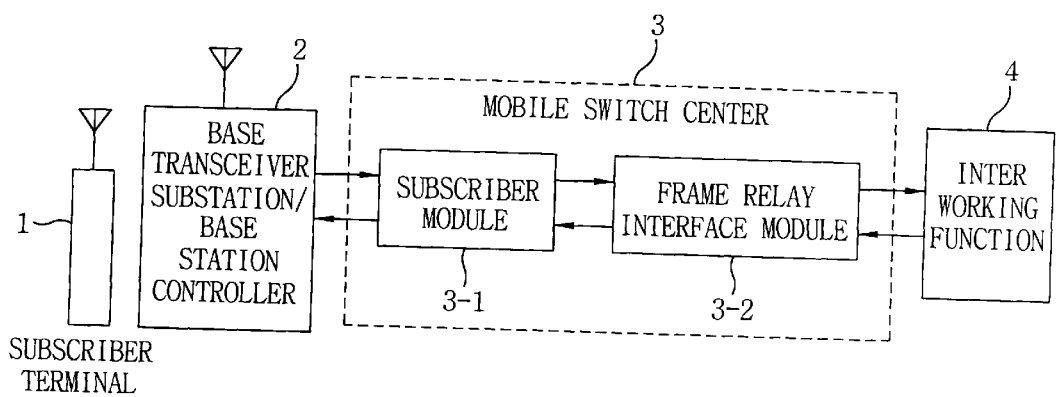
FIG. 1 is a block diagram illustrating a processing system on mobile communication network according to the related art.
Figure 2:
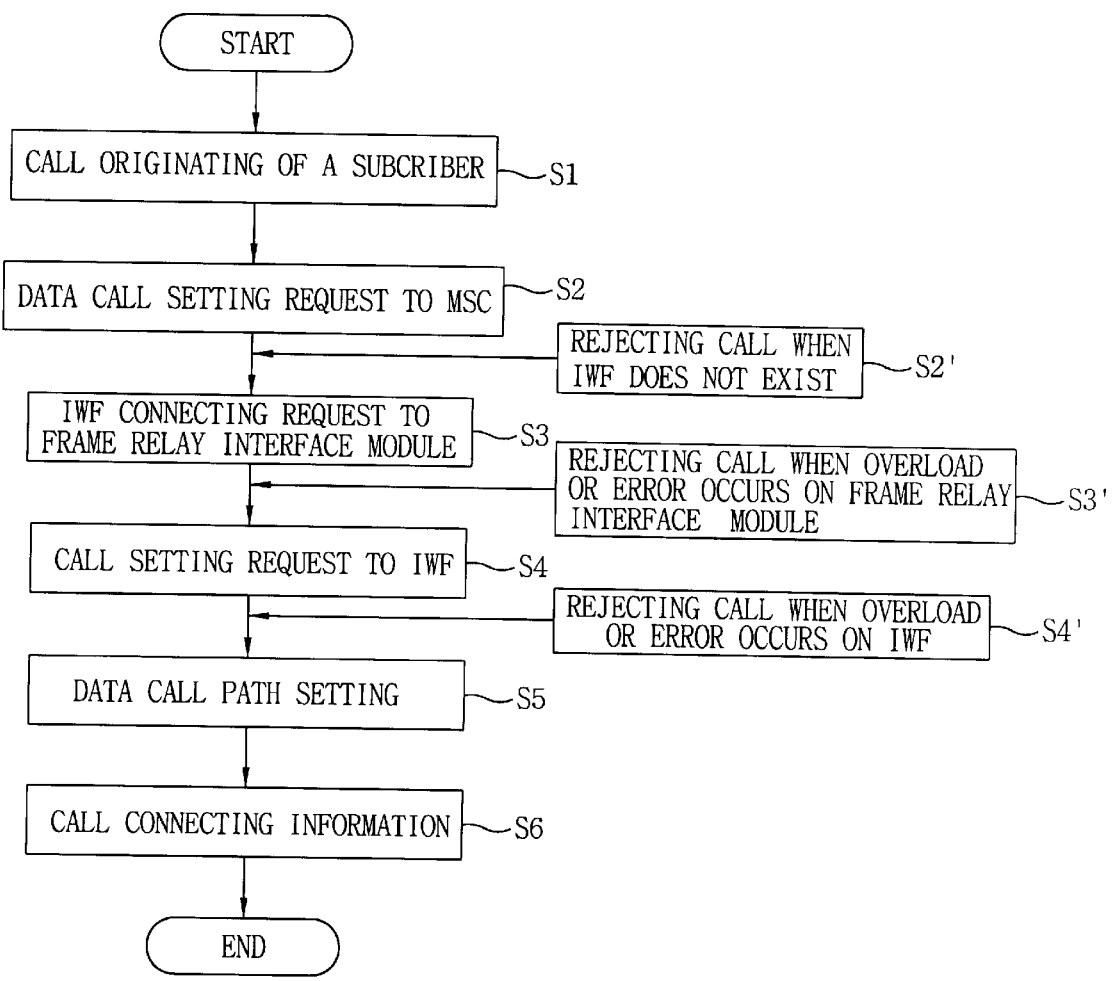
FIG. 2 is a flow chart illustrating a data call processing process on a mobile communication network of the related art.
Figure 3:
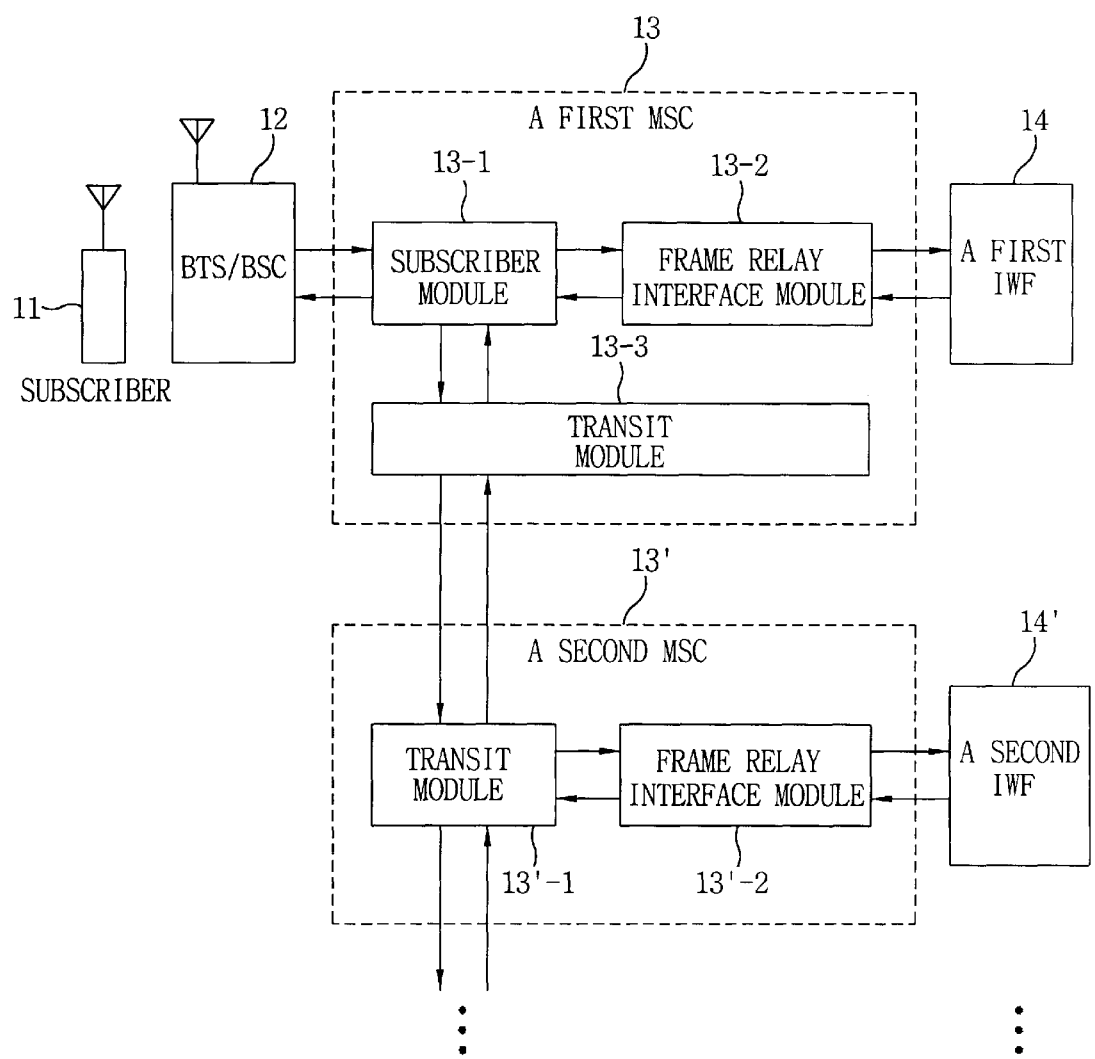
FIG. 3 is a block diagram illustrating a data call processing system on a mobile communication network according to a preferred embodiment of the present invention.

Referring to FIG. 3, a system for performing data call processing according to a preferred embodiment of the present invention comprises a subscriber terminal 11, a Base Transceiver Subsystem/Base Station Controller (BTS/BSC) 12, first and second Mobile Switch Centers (MSC) 13, 13', and first and second Interworking Functions (IWF) 14, 14'. The first MSC 13 includes a subscriber module 13-1, a frame relay interface module 13-2, and a transmit module 13-3. The second MSC 13' includes a transit module 13'-1 and a frame relay interface module 13'-2.

Each MSC 13,13' has a database which holds information indicating whether data service of the MSC is possible, based on a state of the frame relay interface module and the IWF. Further, the modules in each MSC 13,13' may share the database or may respectively have the database which maintains a state information of corresponding IWF consistently among the databases.

Although FIG. 3 illustrates only two MSCs 13, 13' and two IWFs 14, 14', it should be understood that a plurality of MSCs and IWFs can be coupled in this fashion.

Referring to FIG. 4, a process for data call processing according to a preferred embodiment will be described. First, a database that lists other MSCs which are available to be connected to when data service of a first MSC is impossible is provided to each MSC. For purposes of discussion, as used herein, the first MSC 13 is the initial MSC, and the second MSC 13' and additional MSCs (not shown) are the second or other MSCs. Thus, in the preferred embodiment of the present invention, the first MSC 13 is connected to the second MSC 13' when data service of the first MSC 13 cannot be established.

Each call processing circuit and state management circuit (not shown) of each MSC 13, 13' detects a state of the frame relay interface modules 13-2, 13'-2 and IWFs 14, 14'. They then provide each state to the database, indicating whether data service is possible.

When an originating data call is inputted from a mobile communication subscriber 11 as shown in step S11, the BTS/BSC 12 requests a data call setting from the first MSC 13 as shown in step S12.

When a call that requires data service is inputted, the subscriber module 13-1 of the first MSC 13 searches the database as shown in step S13. The first MSC 13 next determines if data service is possible, as shown in step S14. If data service is possible through the first MSC 13, it performs a data call setting function with the first IWF 14 through the frame relay interface module 13-2 of the first MSC 13 as shown in step S20.

If, however, data service cannot be established, as shown in step S14, the subscriber module 13-1 of the first MSC 13 establishes communication with the transit module 13'-1 of the second MSC 13', through the first transit module 13-3, as shown in step S15.

The second transit module 13'-1 of the second MSC 13' receives the connection request and analyzes the service option of the inputted call as shown in step S16. If it determines that the service option is data service as shown in step S17, it searches its database as shown in step S18.

If, as the result of the search, it determines that data service is possible as shown in step S19, a call connection setting with the second IWF 14' is performed through the second frame relay interface module 13'-2, as shown in step S20. If, however, data service is not possible, the process repeats, and the call is switched to one of the other MSCs (not shown).

In order to prevent an infinite repetition of the process, a number of transfers is counted whenever a call passes through an MSC as shown in step S21. When the count number exceeds a prescribed maximum number of transfers MAX as shown in step S22, it is determined that an error has occurred, and the pertinent call is rejected as shown in step S23. The maximum number of transfers MAX can preferably be changed by an operator.

Even if a state of the each MSC 13, 13' is determined to be able to provide data service in steps S14 and S19, an overload or an error of the frame relay interface module 13-2, 13'-2 or the IWF 14, 14' may occur during the call connection setting between the first and second frame relay interface module 13-2, 13'-2 and the IWF 14, 14'. Accordingly, the first and second MSCs 13, 13' perform the call setting process as depicted in figure .

Referring to FIG. 5, when a connection request for connecting to the IWF 14 is inputted to the frame relay interface module 13-2 as shown in step S20-1, a state of the frame relay interface module 13-2 is recognized from the call processing circuit and state management circuit (not shown) of the frame relay interface module 13-2, as shown in step S20-2. When all overload or an error occurs on the frame relay interface module 13-2, the process is returned to step S15 (FIG. 4) in order to perform an outgoing call to the second MSC 13', which then performs the above-described process.

If, on the other hand, the frame relay interface module 13-2 is in a normal state, the frame relay interface module 13-2 requests call setting to the IWF 14, as shown in step S20-3.

When an overload or error occurs during the signaling process with the IWF 14, as shown in step S20-4, the process is returned to step S15 (FIG. 4), and performs an outgoing call to the second MSC 13'.

When the IWF 14 is in a normal state, the frame relay interface module 13-2 allots the H0 channel as the frame relay bearer channel through signaling with the IWF 14. This is preferably done in accordance with a defined standard of IS-658 (TIA/EIA) and Q.933 (ITU-T). It also sets the data transmission path as shown in step S20-5, and informs the terminal of the call connection setting as shown in step S20-6.

As described above, an apparatus and a method for processing data call on mobile communication network according to a preferred embodiment of the present invention is capable of providing reliable data service by communications with other switches wheel an overload or error occurs on the first frame relay module and IWF. It also provides data service by using resources of the second MSC if the first MSC is without an IWF. Accordingly it is possible to make the best use of resources.

Additionally, when changing or testing IWF equipment of one MSC is performed, data service can be continually provided by routing the traffic to the other MSC.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for processing a data call on a mobile communication network, comprising:
   a first mobile switch center (MSC), which is configured to receive an incoming data call and to establish direct communication with a second MSC when data service is not available through the first MSC; and
   a second MSC, which receives an incoming communication of the first MSC and provides a data call path for the data call, wherein the first MSC further comprises:
   a subscriber module configured to connect with a first interworking function (IWF) when a data call setting request is inputted and data service of the first MSC is possible;
   a first frame relay matching module configured to set a data call path of the first IWF in accordance with a prescribed protocol;
   a first transit module configured to establish direct communication with the second MSC when data service of the first MSC cannot be established; and
   a database, which holds information indicating whether data service of the first MSC is possible, based on a state of the first frame relay matching module and the first IWF.

2. The apparatus of claim 1, wherein the subscriber module is configured to search the database and request communication with the second MSC through the first transit module when data service is not available in the first MSC.

3. The apparatus of claim 1, wherein the first frame relay matching module comprises a call processing circuit and state management circuit configured to check an overload and error state of the first frame relay matching module and the first IWF, and provide the database with information as to whether data service of the first MSC is possible.

4. The apparatus of claim 1, further comprising a plurality of MSCs, each one of the plurality capable of being directly communicatively coupled to the previous MSC, and the first one of the plurality capable of being communicatively coupled to the second MSC.

5. The apparatus of claim 1, wherein the second MSC comprises a transit module configured to receive the data call from the first MSC, and a frame relay matching module, which sets a data call path of the second IWF in accordance with a prescribed protocol.

6. The apparatus of claim 5, wherein the transit module is configured to establish communication with a third MSC when the second MSC cannot establish data service.

7. The apparatus of claim 5, wherein the frame relay matching module has a call processing circuit and a state managing circuit configured to check for an overload or error state of the frame relay matching module and the second IWF, and provide the database with information as to whether data service of the second MSC is possible.

8. The apparatus of claim 1, wherein the second MSC comprises a second transit module, which is configured to couple to the first transit module to receive the incoming data call.

9. The method of claim 1, wherein data services not available to the first MSC when a first frame relay matching module of the first MSC is in one of an overload state and an error state.

10. The method of claim 1, wherein data services not available to the first MSC when a first interworking function coupled to the first MSC is in one of an overload state and an error state.

11. A method for processing a data call in a mobile communication network, comprising:
   (1) recording in a database whether data service of a first MSC is possible after checking each of an overload and error state of the first MSC;
   (2) determining whether data service of the first MSC is possible after searching the database when a data call setting request is inputted;
   (3) establishing a direct communication link between the first MSC and a second MSC when data service of the first MSC cannot be established;
   (4) providing data service through the second MSC by receiving and processing the call from the first MSC setting the data call path and an interworking function (IWF) of the second MSC; and
   (5) providing data service by setting a data call path of a first IWF coupled to the first MSC when data service of the first MSC is possible, wherein step (5) further comprises:
   requesting a connection with the first IWF by a first frame relay matching module of the first MSC;
   confirming an overload or error state of the first frame relay matching module;
   requesting a data call setting to the first IWF when the first frame relay matching module is normal;
   confirming an overload or error state of the first IWF; and
   setting the data call path of the first IWF in accordance with a prescribed protocol when the state of the first IWF is normal.

12. The method of claim 11, wherein the second MSC establishes communication with at least one of a plurality of MSCs when data service of the second MSC is not possible.

13. The method of claim 11, wherein the fifth step is returned to the third step and establishes contact with the second MSC when the state of the frame relay matching module is the overload or error state.

14. The method of claim 11, wherein the fifth step is returned to the third step and establishes communication with the second MSC when the state of the first IWF is the overload or error state.

15. The method of claim 11, wherein the fourth step comprises:
   analyzing a service option of an incoming call;
   confirming whether data service is possible when the service option is data service; and
   setting a data call path in accordance with a prescribed protocol when data service is possible.

16. The method of claim 15, further comprising:
   recording in the database whether data service is possible by checking an overload or error state of the second MSC to confirm whether data services is possible.

17. The method of claim 15, further comprising:
   repeatedly establishing direct communication with a succeeding one of a plurality of MSCs if data communication cannot be established in a preceding MSC, analyzing a service option of the incoming call, and setting the data call path in an available one of the MSCs of the plurality of MSCs.

18. The method of claim 17, further comprising:

counting a number of attempts whenever a call is routed to another MSC; and rejecting the call when the counted number of attempts exceeds a prescribed maximum number of attempts.

19. The method of claim 15, wherein the step of setting the call path further comprises:

requesting a connection to a first frame relay matching module by a first IWF;

confirming an overload or error state of the first frame relay matching module;

requesting the data call setting to the first IWF when the state of the first frame relay matching module is a normal state;

confirming the overload or error state of the first IWF; and setting the data call path of the first IWF in accordance with a prescribed protocol when the state of the first IWF is a normal state.

20. The method of claim 11, wherein data service of the first MSC cannot be established when a first frame relay matching module of the first MSC is in one of an overload state and an error state.

21. The method of claim 11, wherein data service of the first MSC cannot be established when a first interworking function coupled to the first MSC is in one of an overload state and an error state.

* * * * *